A. B. Wilson.
Sewing Machine
No. 345
Reissued Jan. 22, 1856.
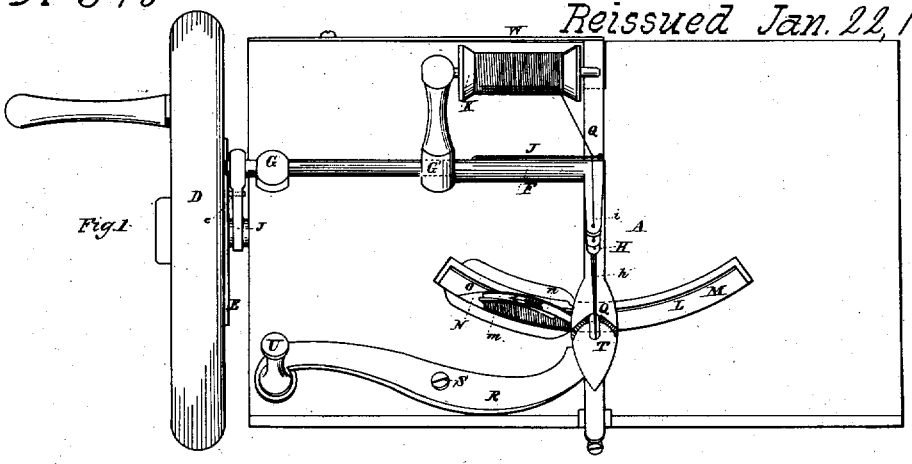
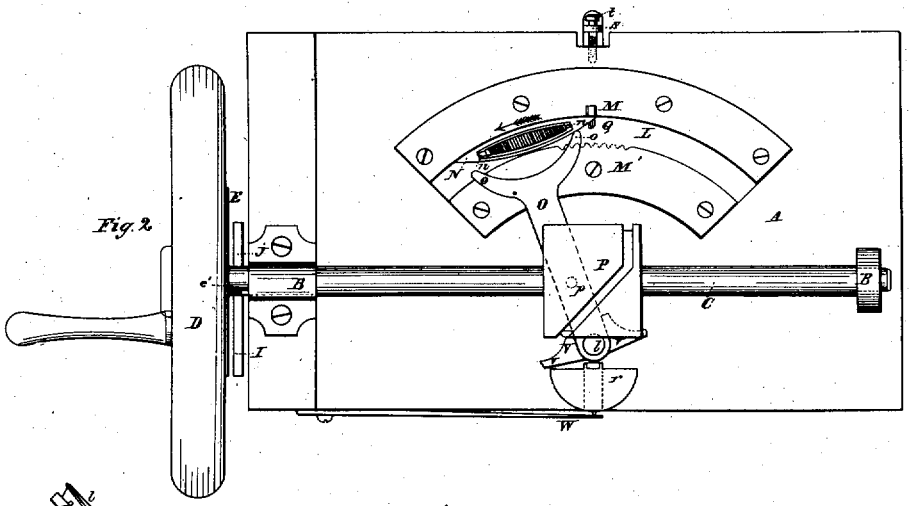
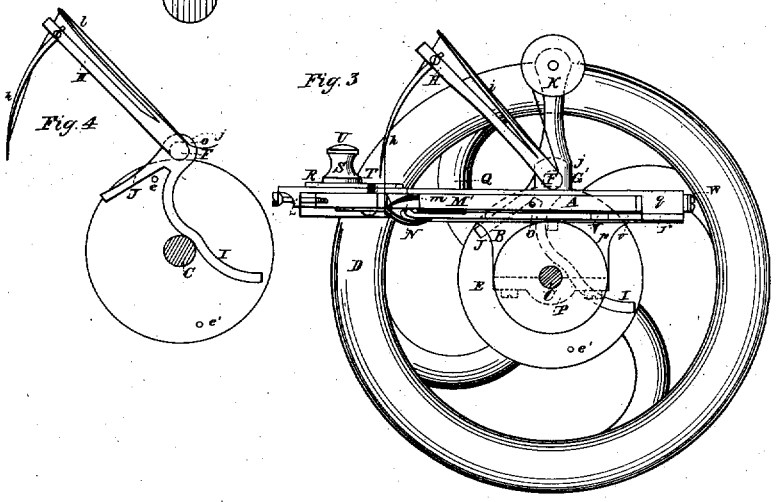

UNITED STATES PATENT OFFICE.

ALLEN B. WILSON, OF PITTSFIELD, MASSACHUSETTS.

IMPROVEMENT IN SEWING-MACHINES.

Specification forming part of Letters Patent No. 7,776, dated November 12, 1850; Reissue No. 345, dated January 22, 1856.

*To all whom it may concern:*

Be it known that I, ALLEN B. WILSON, of Pittsfield, in the county of Berkshire and State of Massachusetts, have invented certain new and useful Improvements in a Machine for Sewing Cloth and other Fabrics; and I do hereby declare that the following is a full description of the same, reference being had to the accompanying drawings, forming part of this specification, in which—

Figure 1 is a view of the upper side of the machine, taken in an oblique direction. Fig. 2 is an inverted plan view of the under side of the machine. Fig. 3 is a section taken through the center of the plate, leaving the working parts of the machine entire. Fig. 4 is a detailed view of the motion for operating the needle.

Similar letters of reference indicate corresponding parts in each of the several figures.

My improvements consist, first, in an improved mode of operating the vibrating arm which carries the needle; secondly, in an improved mode of operating the shuttle, by which I can pass a thread during each of its motions, one during its motion in one direction and another during its motion in the opposite direction.

To enable those skilled in the art to make and use my invention, I will proceed to describe its construction and operation.

A is a plate of metal, of suitable form and strength, provided on its under side with bearings B B, which may be cast with it.

C is the driving-shaft, which is mounted in the bearings B B, and carries a small fly-wheel, D.

E is a circular disk of metal attached to or cast with the fly-wheel D.

*e e'* are small studs or pins inserted in the face of the disk E, on the same diameter and at equal distances from the center or axis of the shaft C.

F is a shaft or spindle mounted in bearings G G', secured to the upper side of the plate A.

H is the needle-arm, which is attached to the end of the shaft F, and is provided near its end with an eye.

I and J are a pair of curved levers secured on the shaft F, forming an escapement motion, and are actuated by the studs *e e'* on the disk E for the purpose of operating the needle-arm H. *h* is the needle, which is curved in the form of an arc of which the axis of the shaft F is the center. It is slightly grooved on its front side to guide the thread, and is provided near its point with an eye through which the thread passes. It is screwed in the needle-arm by a set-screw.

*i* is a spring attached to the upper or back side of the needle-arm H, and provided near its end with an eye, which forms an elastic guide for the thread as it passes to the needle, and is of such strength as to yield readily to the tension of the thread. This spring performs, acting in combination with the shuttle, two important functions. It will readily be seen that as much more length of the needle-thread is required to surround the shuttle and allow its passage through the loop of the needle-thread than is used in making one stitch. This surplus thread needs to be controlled and held back from under the point of the needle in its descent, and to yield at the proper time to allow the shuttle to pass. These two functions are performed by this spring acting in combination with the shuttle. Thus when the needle is at its highest point this spring, by the tension of the thread in pulling up the stitch, is drawn down in contact with the needle-arm H, and as the needle descends this spring, being relieved by the slackening of the tension on the thread, returns to its proper position when not acted upon, and in so doing holds back the thread from the needle-point. When the shuttle passes through the loop, this spring, yielding readily to the tension of the thread, is again brought down in contact with the needle-arm H, and this gives off the slack thread it has taken up and allows the shuttle to pass.

K is a spool carrying the needle-thread. It turns easily on a spindle, *k*, attached to a pillar above the bearing G' of the shaft F.

*j* is a presser-guide for keeping the thread tight in its passage to the needle.

N is the shuttle, which is of metal, pointed at each end and provided at each side with a groove.

*n* is the bobbin.

*m* is the thread-guide.

L is a slot in the plate A, forming the shuttle-path.

M M' are two plates of steel screwed to the under side of the plate A, and having their edges projecting slightly over the shuttle-path, so as to fit the grooves in the shuttle and form guides for it. The plate M′ is provided near the middle of its edge with notches into which the needle-thread falls while the loop is being filled, so as to prevent the thread being cut by the edge of the plate.

O is the shuttle-driver, which consists of a flat lever vibrating on a fixed center, *l*, on a line with the center of the needle, at right angles to the shaft F, having forked arms *o o*, the ends of which are rounded, so as to fit slight indentations on the back side of the shuttle. The shuttle-path L is in the form of an arch of which *l* is the center.

P is a cam-barrel on the main shaft.

*p* is a pin or stud on the under side of the shuttle-driver O, fitting easily in an eccentric groove in the cam-barrel P, which groove is of the required form to give motion in one direction to the shuttle-driver for every operation of the needle-arm H.

Q is a flat bar of metal on which the cloth is laid. It slides on the plate A in a line with the center of the needle-arm. It is provided on its under side, at its back end, with a guide-piece, *q*, sliding in a slot in the back edge of the plate A, and a small plate, *r*, of semicircular form, having its edges lapping under the plate A. On the under side of the front end of the bar Q is a lip, *s*, provided with a hole through which a screw, *t*, passes and is screwed into the edge of the plate A. A recess is cut in the edge of the plate to receive the lip *s*. A slot is cut through the bar Q for the needle to pass through.

R is a flat lever so constructed as to spring or yield, having its center S screwed in the plate A, and having a clamping-piece or bill, T, at one end, which lies on the sliding bar Q and holds the cloth by a yielding pressure to the feeding-surface of said sliding bar.

R is provided at its end with a slot for the needle *h* to pass through. The sliding bar Q is swelled out and is toothed on that part of its face on which the clamping-piece T lies.

V is a handle or knob for operating the lever R. It has a small stud on its under side, which is made to enter a recess in the plate A to secure the lever in its position.

V is the feeding-plate, attached to the back end of the shuttle-driving lever O, and having two projecting faces, *v v*, standing nearly at right angles to the center of the lever. As the lever vibrates, these faces come alternately in contact with the straight edges of the semicircular plate *r* and move back the sliding bar Q, which, on the projection on the feeding-plate V being removed, is brought back to its original position by the spring W, which is attached to the back edge of the plate A and always bears against the back end of the sliding bar Q. The distance traveled by the sliding bar Q determines the length of the stitch, which is increased by unscrewing the screw *t* and allowing the sliding bar to travel farther back when released from the feeding-plate V, and is shortened by screwing in the said screw. The needle-thread is represented in the drawings by red lines and the shuttle-thread by blue lines. The edge of the cloth is represented in Fig. 3 by green lines.

The plate A is intended to be screwed to a bench or table of any convenient form. It may be screwed to any table, suitable apertures being cut to admit the working of the parts below the plate.

The operation of the machine is as follows: The cloth or material to be sewed is laid with the line of the intended seam along the center of the sliding bar Q and the clamping-piece T brought over it. The end of the thread from the spool K is passed under the presser-guide *j* and through the eye in the spring-guide *i* and needle-arm H, then down the front of the needle and through the eye. The end of the needle-thread and also the end of the shuttle thread are held by the hand of the operator above the plate A. The machine is now ready for operation. Rotary motion is then given to the main shaft C in the direction of the arrows shown in Figs. 3 and 4. The stud *e* on the disk E will then commence operating on the lever I of the escapement motion, and will throw it up, which, turning the shaft F on its axis, will bring down the needle-arm H, carrying the needle and thread with it through the cloth and through a recess provided for it in the plate A in front of the shuttle-path. The thread passing through the cloth with the needle will be held close to it at the point where it intersects the cloth, and being held tightly will leave a space between it and the curved needle, as shown in Fig. 4. Soon after the needle is through the cloth the groove in the cam-barrel P will then, by means of the pin *p*, cause the shuttle-driver to vibrate on its center, and one of the arms *o* will throw the shuttle along its path. The point of the shuttle, which is slightly flattened, will pass between the thread and the needle, and by the time the shuttle is about half-way across its path the stud *e* has commenced operating upon and raising the lever J, and the needle has commenced receding, leaving the thread around the shuttle in the form of a loop. As the shuttle travels on through the loop, the needle continues to recede, taking back the thread, and by the time the shuttle reaches the end of its path the loop is drawn up close to the cloth and tightened. The thread from the shuttle having passed through, it secures or locks it, making what is termed a "lock-stitch." In Figs. 1, 2, and 3 in the drawings the stud *e* is operating on the lever J, and the needle is represented as having been drawn back through the cloth, and the shuttle, which is traveling in the direction of the arrows. Figs. 1 and 2, is just about to leave the loop. So soon as the point of the needle is drawn back through the cloth, the feed-plate V in the back of the shuttle-driver O commences operating on the straight edge of the semicircular plate *r*, driving back the sliding bar Q, and with it the cloth, which is held upon the toothed face of the sliding bar by the clamping-piece T with a yielding pressure imparted by the spring-lever R. The shuttle is for a short time stationary at the end of its path, and the feeding-plate V holds back the sliding bar until the stud *e'* commences operating on the lever I and passes the point of the needle into the cloth. The shuttle-driver is then again brought into action, giving motion to the shuttle in the opposite direction, the feeding-plate gradually releasing the sliding bar Q, which is driven back by the spring W, the cloth being prevented from going back with the sliding bar by the needle which holds it. The shuttle proceeds onward, passing its thread through the loop formed by the needle-thread, as before described, the shuttle passing a loop through each loop formed by the needle-thread alternately back and forth, and the sliding bar moving the cloth back at the proper time for passing the thread through it, and slipping from the cloth, while it (the cloth) is held by the needle, so as to be ready for another motion. When two or three stitches have been made, so as to secure the ends of the thread, the thread may be released from the hand of the operator, and the rotary motion of the shaft C being continued, the operation of the machine will proceed.

What I claim as my invention, and desire to secure by Letters Patent, is—

Forming a stitch by each throw of the shuttle and corresponding motion of the needle—that is to say, making one stitch at each forward and another at each backward motion of the shuttle, this being effected by the needle in combination with the shuttle, both constructed, arranged, and operated as herein described, or in any other mode substantially the same.

ALLEN B. WILSON.

Witnesses:
B. I. PEUGH,
JAMES J. GILMORE.